(12) United States Patent
Wang et al.

(10) Patent No.: US 11,368,236 B2
(45) Date of Patent: Jun. 21, 2022

(54) DETECTION AND DECODING OF WIRELESS SYNCHRONIZATION SIGNALS

(71) Applicant: Cisco Technology Inc., San Jose, CA (US)

(72) Inventors: Huaiyi Wang, North Royalton, OH (US); Matthew Aaron Silverman, Shaker Heights, OH (US); Zhigang Gao, Twinsburg, OH (US); Evgeny Yankevich, Beachwood, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 62 days.

(21) Appl. No.: 16/562,598

(22) Filed: Sep. 6, 2019

(65) Prior Publication Data

US 2021/0075534 A1 Mar. 11, 2021

(51) Int. Cl.
| | |
|---|---|
| *H04W 48/16* | (2009.01) |
| *H04J 11/00* | (2006.01) |
| *H04L 5/00* | (2006.01) |
| *H04L 25/03* | (2006.01) |
| *H04W 56/00* | (2009.01) |

(52) U.S. Cl.
CPC ........ *H04J 11/0073* (2013.01); *H04L 5/0005* (2013.01); *H04L 5/0048* (2013.01); *H04L 25/03929* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 9,893,925 B1 | 2/2018 | Patel | |
| 10,057,003 B2 | 8/2018 | Han et al. | |
| 10,200,961 B2 | 2/2019 | Vos et al. | |
| 2006/0223441 A1* | 10/2006 | Darwood | H04L 7/042 455/67.11 |
| 2009/0232125 A1* | 9/2009 | Kim | H04W 36/0061 370/350 |
| 2011/0280189 A1* | 11/2011 | Tsuboi | H04L 27/2621 370/328 |

(Continued)

OTHER PUBLICATIONS

"A Low-Complexity Detection Algorithm for the Primary Synchronization Signal in LTE", Mohammad H. Nassralla, and L.M.A. Jalloul, IEEE Transactions on Vehicular Technology, vol. 65, No. 10, Oct. 2016.

(Continued)

*Primary Examiner* — Brandon M Renner
(74) *Attorney, Agent, or Firm* — Baker Botts, LLP

(57) ABSTRACT

A wireless node in a wireless communication network. The wireless node includes one or more interfaces configured to receive wireless transmissions, a memory comprising instructions, and a hardware processor. The wireless node samples a received wireless transmission into a plurality of time-based subdivisions for each subdivision of the wireless transmission the wireless node determines a cross-correlation between the subdivision and a local syncword. The local syncword is constructed to correlate to any primary synchronization signal, PSS, of a plurality of PSSs defined for synchronization in the wireless network. The wireless node, based on the cross-correlation, determines whether one PSS of the plurality of PSSs is present in the subdivision of the wireless transmission.

20 Claims, 4 Drawing Sheets

(56) References Cited

U.S. PATENT DOCUMENTS

| | | | | |
|---|---|---|---|---|
| 2016/0337105 | A1* | 11/2016 | Lawton | H04L 1/0026 |
| 2017/0223648 | A1* | 8/2017 | Shin | H04J 11/0073 |
| 2017/0257243 | A1 | 9/2017 | Sahlin et al. | |
| 2018/0077630 | A1* | 3/2018 | Kuchi | H04W 48/16 |
| 2018/0213495 | A1* | 7/2018 | Kim | H04W 56/001 |
| 2018/0255521 | A1 | 9/2018 | Reial | |
| 2018/0278455 | A1* | 9/2018 | Reial | H04L 27/2663 |
| 2018/0332551 | A1* | 11/2018 | Liu | H04W 56/0005 |
| 2020/0275393 | A1* | 8/2020 | Shin | H04J 11/00 |
| 2021/0058206 | A1* | 2/2021 | Ye | H04L 5/0053 |

OTHER PUBLICATIONS

"A Robust Scheme for PSS detection and Integer Frequency Offset Recovery in LTE Systems", M. Morelli and M. Moretti, arXiv e-prints, arXiv: 1505.02950, May 2015.

"Delay Analysis of OFDMA-Aloha", A. Mutairi, S. Roy, and G. Hwang, IEEE Transactions on Wireless Communications, vol. 12, No. 1, Jan. 2013.

"OFDMA Architectures, Protocols, and Applications", EURASIP Journal on Wireless Communications and Networking, Apr. 16, 2009, Article No. 703083.

"Adaptive resources allocation in multiuser OFDM systems with proportional rate constraints," IEEE Transactions on Wireless Communications, Z. Shen, J.G. Andrews, and B.L. Evans, vol. 4, No. 6, Nov. 2005.

"Optimal Resource Allocation in OFDMA Systems with Imperfect Channel Knowledge", I.C. Wong and B.L. Evans, IEEE Transactions on Wireless Communications, vol. 57, No. 1, Jan. 2009.

"A Low Complexity Algorithm for Proportional Resource Allocation in OFDMA Systems" I.C. Wong, Z. Shen, B.L. Evans, J.G. Andrews, IEEE Workshop on Signal Processing Systems, Oct. 2004.

"Optimal Downlink OFDMA Resource Allocation With Linear Complexity to Maximize Ergodic Rates", I.C. Wong and B.L. Evans, IEEE Transactions on Wireless Communications, vol. 7, No. 2, Feb. 2008.

"Adaptive Downlink OFDMA Resource Allocation", I.C. Wong and B.L. Evans, IEEE Asilomar Conference on Signals, Systems and Computers, Pacific Grove, CA, Oct. 26-28, 2008.

* cited by examiner

DETECTION AND DECODING OF WIRELESS SYNCHRONIZATION SIGNALS

TECHNICAL FIELD

Certain embodiments of the present disclosure relate, in general, to wireless communications systems, and, in particular, to detection of synchronization signals.

BACKGROUND

Synchronization signals are used within wireless networks to synchronize transmissions between nodes, such as between wireless access points and network nodes or between base stations and wireless terminals. The primary synchronization signals, PSSs, are used by Long-Term Evolution (LTE) and New Radio (5G NR) base stations for cell identification and radio frame timing. The PSSs may be used to derive system configuration for transmissions in WiFi channels, which can be used to determine whether the used spectrum is efficient and legally utilized.

BRIEF DESCRIPTION OF THE DRAWINGS

For a more complete understanding of the disclosed embodiments and their features and advantages, reference is now made to the following description, taking in conjunction with the accompanying drawings, in which.

DESCRIPTION OF EXAMPLE EMBODIMENTS

Overview

Figure 1:
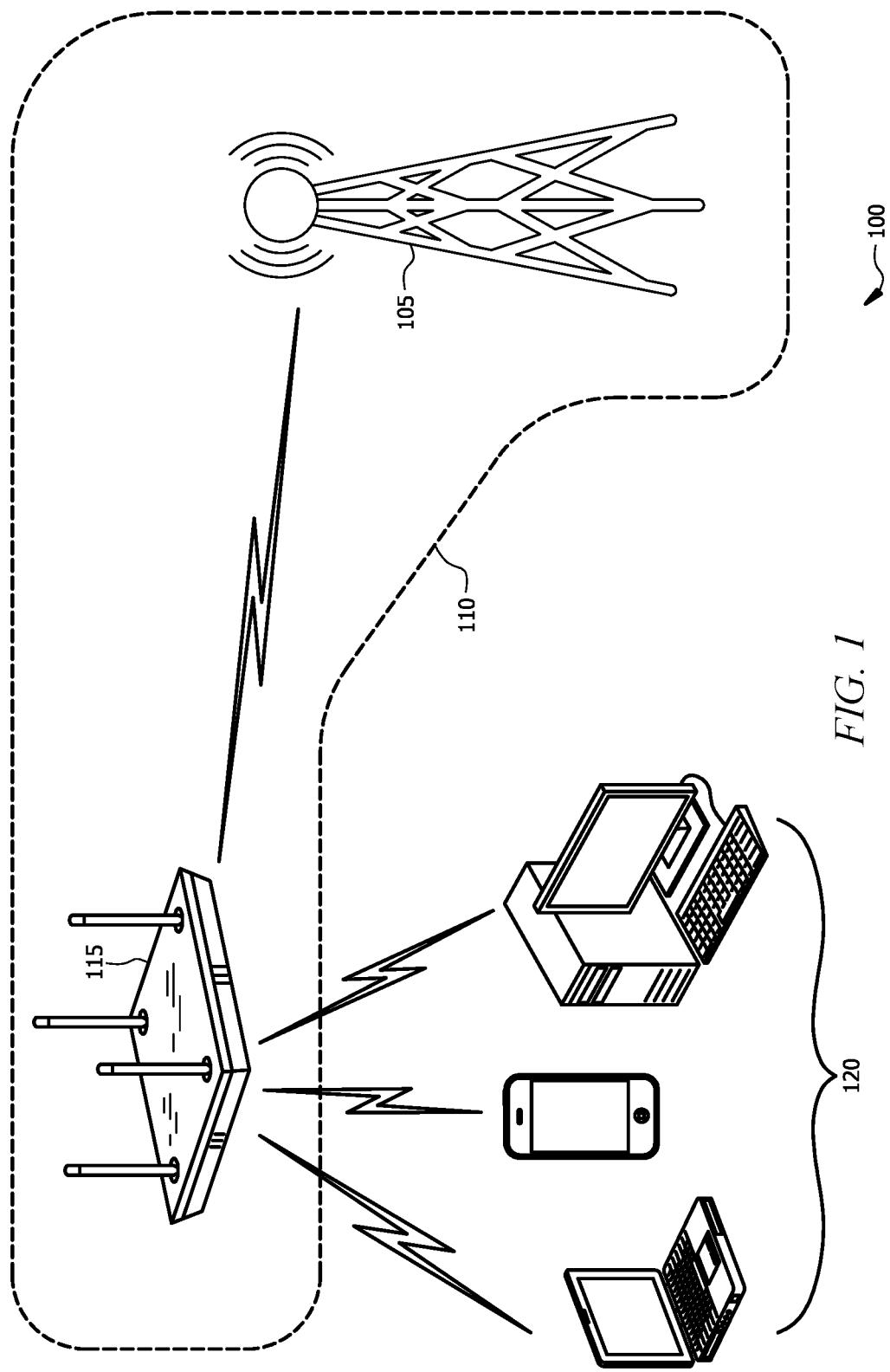
FIG. 1 illustrates an example wireless network with a wireless node, in accordance with certain embodiments.

According to an embodiment, a method is provided for use in a wireless network. The method includes sampling a received wireless transmission into a plurality of time-based subdivisions. The method further includes, for each subdivision of the wireless transmission, determining a cross-correlation between the subdivision and a local syncword. The local syncword is constructed to correlate to any primary synchronization signal, PSS, of a plurality of PSSs defined for synchronization in the wireless network. The method further includes, determining, based on the cross-correlation, whether one PSS of the plurality of PSSs is present in the subdivision of the wireless transmission.

Example Embodiments

Embodiments of the present disclosure and its advantages are best understood by referring to FIGS. 1 through 5 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

Detection and decoding of primary synchronization signals, PSSs, are fundamental steps in identifying cells and accessing wireless resources on those cells. There are several current problems associated with the detection of PSSs that are not addressed by conventional methods and systems for detecting PSSs. As an example, three PSSs are defined for each of 5G NR (New Radio) and LTE (Long-Term Evolution). Conventional detection methods perform a one-by-one correlation process for each PSS for each sampled portion of the received transmission. In particular, the known PSS sequence is compared to each sampled portion of a transmission to determine whether the sampled portion contains the known PSS sequence. This process is then repeated for each PSS, e.g., for each of the three PSSs defined for LTE or for 5G NR. This correlation process occurs for each sampled portion of the transmission, even though a PSS is located sparsely in the transmission, e.g., two symbols across an entire 10 ms radio frame. Thus, a large number of processing resources are expended comparing each PSS to the sampled portions of the transmissions when no PSS sequence is present.

Another existing problem relates to detecting PSSs when there are large frequency offsets. For example, relaxed wireless standards and channelization strategies may result in frequency offsets of the PSS to a specific wireless channel that approach 300 kHz. As a result, conventional methods require a computationally intensive step-by-step frequency search. For example, conventional methods first process the signal, e.g., the correlation processing described above, assuming a particular frequency of transmission of the PSS and repeat for different frequency intervals. Accordingly, for large potential frequency offsets, the number of frequency steps may be numerous, and thus may require an enormous amount of computing resources to ensure detection. As a result of these two unaddressed problems, the amount of resources required to detect PSS present a significant constraint of wireless systems and may limit the use of different wireless resource spectra and other enhanced processes at the wireless-node side.

Described herein are solutions addressing one or more of the technical problems identified above. For example, certain embodiments provide a local syncword that may be used to detect when any of the defined PSSs are present in a portion of the transmission. The local syncword may be used to determine a cross-correlation with each sampled portion of the transmission and all of the PSSs. If a PSS is determined to be present, the sampled portion may be further processed to determine which of the PSSs is present, which can be used to identify the cell, determine radio frame timing, and/or derive system configuration information for the transmitting network node. Additionally, certain embodiments use the symmetry of excerpted or padded PSSs to reduce the negative impact of frequency offset. For example, time domain multiplication of symmetric portions of the PSS may result in a common phase offset that does not affect the cross-correlation of the PSS with the local syncword. Further technical improvements are detailed herein in reference to particular embodiments.

As described in detail herein, one or more embodiments provided in this disclosure may include one or more technical advantages or solutions to existing technical problems.

For example, certain embodiments may drastically reduce the processing resources and time to detect a PSS used for a cell in a wireless network. In particular, a local syncword may be defined to be correlated to all PSSs defined for use in the wireless network. A wireless node, such as a wireless access point or a user equipment, may use the local syncword to detect the presence of a PSS in a portion of the transmission from a network node serving the cell. Then that portion may be processed and compared to known PSS sequences to identify the PSS used in the cell. As a result, the amount of the transmission being processed to determine correlations with each PSS may be reduced, thereby reducing the amount of processor cycles and energy required to detect and identify a PSS. As another example, certain embodiments further reduce processing resources required to detect and identify a PSS by reducing the need or completely obviating a step-by-step frequency search. A wireless node may use the symmetry of PSSs by pairwise multiplying symmetric components of the PSS sequence to average the phase rotation resulting from the frequency offset. In this manner, the correlation calculations account for the frequency offset instead of requiring costly step-by-step frequency searches.

Certain embodiments may have none, some, or all of the above-recited advantages. Other advantages may be readily apparent to one having skill in the art in light of the present disclosure.

Although the subject matter described herein may be implemented in any appropriate type of system using any suitable components, the embodiments disclosed herein are described in relation to a wireless network, such as the example wireless network 100 illustrated in FIG. 1. For simplicity, FIG. 1 illustrates wireless network 100 with a network node 105 serving a cell 110, a wireless node 115, and terminal devices 120. In practice, a wireless network may further include any additional elements suitable to support communication between wireless devices or between a wireless device and another communication device, such as a landline telephone, a service provider, or any other network node or end device. Wireless network 100 may provide communication and other types of services to one or more wireless devices to facilitate the wireless devices' access to and/or use of the services provided by, or via, the wireless network.

Generally, wireless node 115 may be located within cell 110 served by network node 105. In particular, network node 105 may broadcast wireless transmissions within cell 110 and establish communication with devices or other wireless equipment within locations covered by cell 110.

Wireless node 115 may obtain information regarding network node 105 from transmissions that are broadcast within cell 110 or transmitted directly to wireless node 115. For example, network node 105 may transmit one or more synchronization signals that enable wireless nodes and wireless terminals to connect with network node 105.

In certain networks, such as Long-Term Evolution (LTE) and New Radio (5G NR) radio networks, there are two downlink synchronization signals which are used by the user equipment or other wireless nodes to obtain the identity of cell 110 cell identity, the timing of the transmission frame, and other configuration information. These two synchronization signals are typically referred to as the primary synchronization signal (PSS) and secondary synchronization signal (SSS). Conventionally, the PSS is linked to the cell identity within the group and the SSS is linked to the cell identity group and the cell identity within the group. Wireless node 115 can obtain the cell identity within the group of cell 110 by successfully demodulating the PSS. The SSS can then be demodulated and combined with knowledge of the cell identity within the group of cell 110 to obtain the cell identity group. Using this information, wireless node 115 may obtain the identity of cell 110.

Without a priori knowledge regarding network node 105, wireless node 115 does not know the identity of cell 110 or what PSS or SSS is transmitted by network node 105. Accordingly, wireless node 115 decodes the PSS and the SSS transmitted by network node 105, e.g., in transmission 125, to obtain the identity of cell 110 and determine the configuration information of cell 110 and network node 105 that may enable wireless node 115 to establish connection within cell 110 or otherwise determine the characteristics of network node 105.

For example, after decoding the PSS and SSS, wireless node 115 may wireless communicate with network node 105 and may relay transmissions to and from network node 105 with one or more terminal devices 120. Accordingly, wireless node 120 may learn the characteristics of communications within wireless network 100 and communicate within network 100.

Wireless network 100 may comprise and/or interface with any type of communication, telecommunication, data, cellular, and/or radio network or other similar type of system. In some embodiments, wireless network 100 may be configured to operate according to specific standards or other types of predefined rules or procedures. Thus, particular embodiments of wireless network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Wireless network 100 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, wireless network 100 may comprise any number of wired or wireless networks, network nodes, base stations, controllers, wireless devices, relay stations, and/or any other components or systems that may facilitate or participate in the communication of data and/or signals whether via wired or wireless connections.

As used herein, network node 105 refers to equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, network node 105 may include an access point (APs) (e.g., radio access points or WiFi APs), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network node 105 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, network node 105 may be a virtual network node. More generally, however, network node 105 may represent any suitable device (or group of devices) capable, configured, arranged, and/or operable to enable and/or provide a wireless device with access to wireless network 100 or to provide some service to a wireless device, such as wireless node 115, that has accessed the wireless network.

As used herein, wireless node 110 and terminal devices 120 may include any device capable, configured, arranged and/or operable to communicate wirelessly with network nodes and/or other wireless devices. In certain embodiments, wireless node 110 or terminal devices 120 includes a user equipment (UE) configured to communicate on an LTE or 5G NR network or a wireless access point configured to communicate according to one or more wireless standards, such as WiFi. Communicating wirelessly may involve transmitting and/or receiving wireless signals using electromagnetic waves, radio waves, infrared waves, and/or other types of signals suitable for conveying information through air. In some embodiments, wireless node 110 may be configured to transmit and/or receive information without direct human interaction. For instance, wireless node 110 or terminal devices 120 may be designed to transmit information to a network on a predetermined schedule, when triggered by an internal or external event, or in response to requests from the network.

Examples of wireless node 110 or terminal devices 120 include, but are not limited to, a wireless access point, a wireless router, a wireless repeater, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

Figure 2:
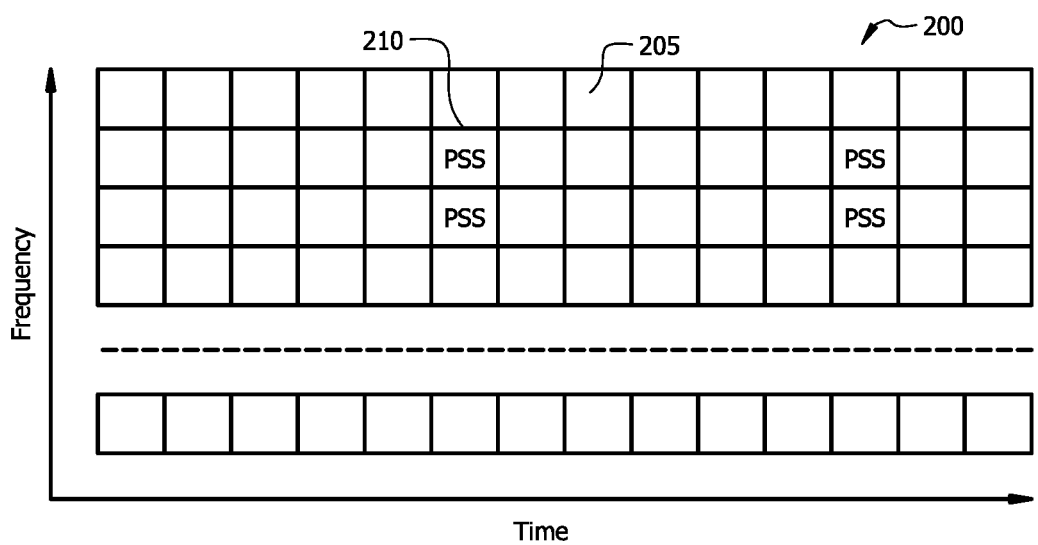
FIG. 2 illustrates an example wireless resource including one or more PSS sequences, in accordance with certain embodiments.

The available wireless resources in a network can be viewed or understood as a time-frequency grid 200, as shown in FIG. 2. The horizontal axis represents time and the vertical axis represents frequency. Grid 200 divides the available resources into one or more time and frequency resources 205. In certain embodiments, the division of resources 205 is based on a standard, such as a WiFi standard or a 3GPP standard. For example, resources 205 may include one or more resource blocks (RBs) as described in reference to radio networks such as an LTE or 5G NR network, resource units (RUs) as described in reference to a wireless network, such as a wireless network implementing OFDM or OFDMA, or subdivisions thereof.

In certain embodiments, grid 200 illustrates the downlink transmission from network node 105 that may be received by wireless node 110. The downlink transmission may include the transmission of a PSS and SSS. For example, PSS sequence 210 be included in a subset of resources 205 at a certain frequency or within a certain frequency band(s). Similarly, PSS sequences 210 may appear in certain time periods. In certain embodiments, PSS sequences 210 may appear periodically. In some embodiments, PSS sequences 210 may be transmitted on resources 205 in a specific subframe and/or slot within every frame of a wireless resource block or resource unit.

In certain embodiments, PSS sequence 210 may carry a value or values chosen from a known set. Because these value or values are chosen from a known set, the value(s) can be recognized by a receiving device, such as wireless node 115, as being part of a synchronization signal (and/or as being a particular type of synchronization signal) even if the receiving device is not yet aware of the frame timing being used in the relevant cell, e.g., cell 110. The receiving device may then use the timing of the PSS sequence 210 to determine the configuration of cell 110, which may enable wireless node 115 to synchronize with cell 110. In particular embodiments, the synchronization signals may also convey additional information based on the specific value(s) selected.

When PSS sequences 210 are for cell 110 in an LTE network, in particular embodiments, cell 110 is associated with one of 504 different physical layer cell identities. The 504 different physical-layer cell identities are divided into 168 different cell-identity groups, each containing three cell identities. In such embodiments, network node 105 transmits a PSS that comprises one of three predetermined Zadoff-Chu (ZC) sequences, with the specific ZC sequence transmitted identifying, from within a particular cell-identity group, the cell identity for the associated cell 110. In such embodiments, network node may also transmit SSSs every frame, with each SSS being transmitted during a predetermined subframe within the frame. Each of the SSSs may be generated from one of 168 predetermined pairs of m-sequences (X and Y), with X and Y being frequency interleaved in the relevant SSS. Accordingly, in this example, wireless node 115 may be able to identify one of 504 different physical-layer cell identities associated with cell 110 by using one of the SSSs to determine a cell-identity group for cell 110 and using the PSS to identify a particular cell identity in that cell-identity group.

The example described above is one example and is not intended to limit the described resources 205 and PSS sequences 210 to any particular standard or implementation. For example, PSS sequences 210 may be generated according to another type of sequence, such as an m-sequence considered for use in 5G NR. Accordingly, although a particular configuration of resources 205 and PSS sequences 210 within resources 205 is described above, any suitable configuration of wireless resources containing a PSS or similar synchronization signal is described herein.

Conventionally, a wireless node, such as wireless node 115, would have to sample every resource 205 and compare each resource 205 to each known PSS sequence to determine correlations between the resource 205 and each PSS sequence. As described above, however, many of the resources 205 do not include a PSS sequence 210 and thus, there are many wasted processing resources in determining the correlations for each known PSS sequence where there is no PSS sequence 210 present. Additionally, detecting the PSS that is transmitted with a frequency offset may require a frequency-step process that further multiplies the number of comparisons and correlations that are required, even if there is no PSS sequence 210 in the processed resource 205.

Figure 3:
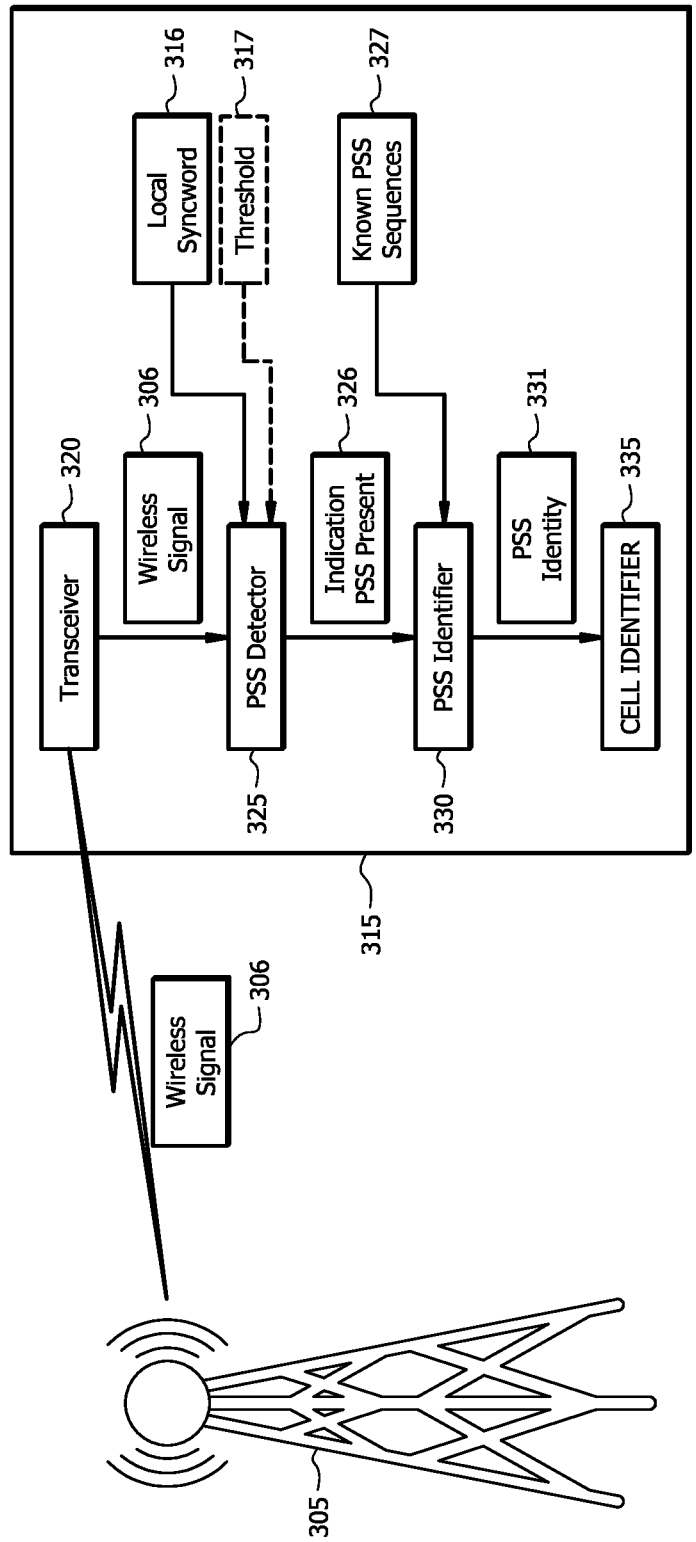
FIG. 3 illustrates a first configuration of a wireless node configured to detect a PSS, in accordance with certain embodiments.

FIG. 3 illustrates a first configuration of a wireless node 315 configured to detect a PSS, in accordance with certain embodiments. Wireless node 315 may have improved PSS-detection capabilities and address the problems described above by reducing the computational resources and processing time required to detect and demodulate the PSS from a transmission. In certain embodiments, network node 305 may transmit wireless signal 306, e.g., by broadcasting in a particular frequency spectrum or spectrums, that includes a PSS. Wireless node 315 may receive wireless signal 306, detect the presence of a PSS in a particular portion of wireless signal 306, identify the present PSS, and use the PSS to identify the cell covered by network node 305.

In particular, in certain embodiments, wireless node 315 may be configured with one or more components or modules configured to carry out certain functionality described herein. The described modules may be implemented in any suitable manner, such as in any suitable combination of hardware and/or software. In certain embodiments, wireless node 315 includes transceiver 320, PSS Detector 325, PSS Identifier 330, and cell identifier 335. Each of the above-listed components may be integrated in the same hardware and/or software or may be implemented on separate hardware and/or software within wireless node 315.

As described above, wireless node 315 may receive wireless signal 306, and, in certain embodiments, receive wireless signal 306 at transceiver 320. Transceiver 320 may be any suitable transceiver capable of transmitting and/or receiving wireless signals, such as analog or digital signals. Transceiver 320 may include any suitable receiver and/or transmitter components and/or electronic circuitry capable of receiving wireless signal 306.

Transceiver 320 may pass along wireless signal 306 to PSS detector 325. PSS detector 325 may sample wireless signal 306 into a plurality of time-based and/or frequency-based subdivisions. For example, PSS detector 325 may divide wireless signal 306 into predetermined-sized portions, e.g., into individual subframes or slots, which can be processed individually by PSS detector. Wireless signal 306 may be continuously sampled until the PSS is identified and/or the cell is identified.

In certain embodiments, PSS detector 325 may be configured to determine whether a PSS is present in one or more subdivisions of wireless signal 306. Instead of cross-correlating every known PSS sequence defined for synchronization in the wireless network, PSS detector 325 may be configured to use a local syncword 316. Local syncword 316 is constructed or defined to be correlated with each of the defined PSS sequences available for use by network node 305.

The PSSs used in a network may have very high cross-correlation, e.g., each of the PSSs are highly correlated with one another. In one embodiment, local syncword 316 is constructed by adding each of the defined PSSs together and using the resulting sequence as local syncword 316. For example, if there are 3 PSSs, PSS1, PSS2, and PSS3, defined for use by network node 305, local syncword 316 may be constructed by stringing PSS1, PSS2, and PSS3 end-to-end, in any permutation. Although the above construction may be attractive due to its simplicity, it may not be the most efficient way to detect the PSS at PSS Detector 325.

In certain embodiments, local syncword 316 is not constructed by adding each of the defined PSS sequences together. For example, if local syncword 316 is constructed by adding each of the known PSS sequences together, e.g., end-to-end, then the mutual correlation properties of the PSS sequences may reduce the ability of PSS detector 325 from getting an accurate detection of the PSS from wireless signal 306. Accordingly, local syncword 316 may be constructed based on a balancing correlation between the known PSSs.

In certain embodiments, local syncword 316 is a solution to a convex optimization set of equations. In some embodiments, additional constraints are considered to regulate the cross-correlation sidelobe level and balance the cross-correlation peak for each PSS. As a particular example, local syncword 316 is defined as the syncword that minimizes the variable "t" under the set of constraints (1)-(3) as presented below.

$$s_1^H q = s_1^H s_1; s_2^H q = s_2^H s_2; s_3^H q = s_3^H s_3 \quad (1)$$

$$q^H R_1^H w R_1 q \leq t; q^H R_2^H w R_2 q \leq t; q^H R_3^H w R_3 q \leq t \quad (2)$$

$$q^H q \leq a s_1^H s_1; q^H q \leq a s_1^H s_1; q^H q \leq a s_1^H s_1 \quad (3)$$

In this particular example, q is the local syncword, t is a dummy variable used to regulate the sidelobe level, $s_i$ is the ith PSS, $R_i$ is the correlation matrix for the ith PSS, w is the diagonal masking matrix used to indicate over which time domain samples the optimization should be performed, and a is a design parameter that indicates the maximum allowed processing loss. Equations (1) provides a first constraint to balance the cross-correlation peaks. Equations (2) provides a second constraint to suppress the sidelobes. Equations (3) provides a third constraint to confine the processing loss. Solving with the constraints, local syncword 316 may be obtained with balanced cross-correlation properties with all the three PSSs. In some embodiments, local syncword 316 has a similar cross-correlation property as the original PSSs. In this manner, a single local syncword 316 may be constructed such that it is correlated with each defined PSS while also minimizing unbalanced correlations between PSSs, suppressing sidelobes, and limiting processing losses.

In some embodiments, the minimization calculation may be performed by wireless node 315 to construct local syncword 316. In other embodiments, the minimization calculation is performed by another node or system communicatively coupled with wireless node 315. For example, local syncword 316 may be computed offline for a particular network in which wireless node 315 may be implemented and stored at wireless node 315 before being installed. In another example, wireless node 315 may receive local syncword 316 from another node or network device, e.g., upon request or as part of an initialization procedure.

PSS detector 325 may, for each subdivision, determine a cross-correlation, e.g., a value representing the similarity between two signals or patterns of bits/symbols, between the subdivision and local syncword 316. The cross-correlation may be carried out by any suitable comparison or correlation algorithm as may be understood by those having skill in the art. Using the determined cross-correlation, PSS detector 325 may determine whether there is a PSS present in the subdivision of wireless transmission 306. For example, in certain embodiments, the cross-correlation is represented by a numerical value. PSS detector 325 may compare that numerical value to a predetermined threshold 317. If the cross-correlation exceeds threshold 317, PSS detector 325 may determine that there is a PSS detector present in that subdivision.

After PSS detector 325 has determined that there is a PSS present in the subdivision, it may indicate, e.g., via Indication PSS Present 326, that it has detected a subdivision with a PSS present. Indication PSS Present 326 may include information indicating the presence of the PSS, including any of the correlation values, the detection time, the subdivision, and any characteristics of the subdivision, e.g., what subframe/slot or symbol the PSS was located in. PSS detector 325 may generate and send Indication PSS Present 326 to PSS Identifier 330.

In certain embodiments, PSS Identifier 330 identifies the PSS as one of the known PSSs defined for use in the wireless network of network node 305. For example, PSS Identifier 330 may receive Indication PSS Present 326 and use known PSS sequences 327 to determine which PSS is present in the subdivision and transmitted by network node 305. In this manner, wireless node 305 need not compare every subdivision of wireless signal 306 to known PSS sequences 327, but only to particular subdivisions identified by PSS detector 325 as having a PSS present. As a result, the number of processing resources required to detect and decode the PSS may be significantly reduced.

In certain embodiments, PSS identity 331 identifying the PSS present in the subdivision may be obtained by PSS identifier 330 by comparing each known PSS in known PSS sequences 327 to the subdivision of wireless signal 306. For example, PSS identifier 330 may determine correlation values between the subdivision and each of known PSS sequences 327. In some embodiments, PSS identifier 330 may determine the PSS to identify in PSS identity 331 based on which of the known PSS sequences 327 has the highest correlation with the subdivision. In certain embodiments, PSS identifier 330 may repeat this process for multiple subdivisions identified by PSS detector 325. For example, PSS identifier 330 may not be able to clearly determine which PSS is present because the correlation values with known PSS sequences 327 are too similar, e.g., within a certain value of one another, or no correlation value is above a predetermined threshold. By repeating the process, PSS identifier 330 may obtain more accurate correlation information and decrease uncertainty of the identification.

PSS identity 331 may be used by cell identifier 335 to determine the identity of the cell served by network node 305. Cell identifier 335 may be configured to use the PSS identity together with any other information, such as a detected SSS or SSSs to determine the cell identity. For example, as described above, the detected PSS and SSS may be combined in determining the cell-group identity and the cell-identity within the group. In this manner, wireless node 315 may determine the identity of the cell served by network node 305. Furthermore, wireless node 315 may determine certain configuration information for the cell, such as the timing of wireless resources, the frequency spectrum/spectra used for communications, etc. In some embodiments, wireless node 315 may use this information to control or adapt its wireless communications, e.g., by adjusting the scheduling of wireless resources or signaling nodes within the wireless network.

In certain embodiments, PSS identifier 330, or another component of wireless node 315, is configured to further process the subdivision and PSS extracted from the subdivision in determining PSS identity 331. For example, PSS identifier 330 may be configured to estimate frequency offset and correct for frequency offset. As mentioned above, frequency offset results in subcarrier offset in the frequency domain, which may decorrelate the received signal and local syncword 316. The maximum tolerable frequency offset depends on the PSS subcarrier spacing and the maximum acceptable processing loss. Wireless node 315 may use the symmetry property of excerpted or padded PSSs to make local syncword 316 more robust to frequency offset. For example, in the presence of a frequency offset, the phase rotation for each time domain sample will accumulate linearly over time, e.g., the phase rotation will be larger for a later time domain sample than an earlier one. Based on this fact, time domain multiplication of the symmetric samples in the sequence has an averaging effect on their phase rotations.

For example, in a particular example, the number of samples in the Cyclic Prefix (CP) of PSSs is K. When the first (K+1) samples of the time domain PSSs are removed, the resulting sequences are symmetric (alternatively, the first (K+1) samples may be excerpted, flipped, and appended to the end of the PSSs to create extended PSSs that are also symmetric). Wireless node 315 may use this symmetry to reduce the effects of frequency offset. In certain embodiments, wireless node 315 processes the symmetric sequences by pairwise multiplying samples that are equidistant from a middle portion of the sequence. For example, if there are N time-domain samples of the symmetric sequence, e.g., the PSS removing the CP samples or the symmetric sequence with the appended, flipped, CP, than sample 0 is multiplied with sample N−1, sample 1 is multiplied with sample N−2, sample 2 is multiplied with sample N−3, and so on unto sample N/2−1 is multiplied by sample N/2+1. Accordingly, a final common phase offset is applied universally to the samples in the time domain sequence. Since the phase offset is constant, final absolute value of the cross-correlation is not affected. In this manner, wireless node 315 may reduce the effects of frequency offset.

In certain embodiments, local syncword 316 has high correlation with each of the PSSs over a large frequency range, e.g., larger than 30 kHz, larger than 50 kHz, larger than 100 kHz, larger than 200 kHz, or larger than 300 kH. As a result, a step-by-step frequency scan may not be required or in some cases limited to fewer frequency steps, thereby reducing the additional processing typically required.

As described above in reference to FIGS. 1-3, wireless node 315 may detect and identify a transmitted PSS in an improved manner by introducing and using local syncword 316, which helps drastically reducing the number of resources and processing power typically required. In the detection stage, local syncword 316 is used to do one-pass cross-correlation with the input signal without using the known PSS sequences, e.g., at PSS detector 325. When detection is confirmed, the sample offset information may be extracted from the correlation peak and wireless node 315 may proceed to the PSS identification stage. In the PSS identification stage, the PSS from the received signal is excerpted based on the detected sample offset, then iterated through all the three possible PSSs, e.g., at PSS Identifier 330 using Known PSS Sequences 327. In certain embodiments, wireless node 315 proceeds in estimating frequency offset, correcting for frequency offset, and cross-correlation for each PSS to identify the root sequence index (or partial cell identity information). In this manner, the PSS may be detected and identified by wireless node 315.

In certain embodiments, the process for detecting the PSS by wireless node 315 may be simplified in certain aspects. For example, once wireless node 315 and the cell served by network node 305 is deployed, the system configuration and frequency offset errors should be fairly consistent over time.

Accordingly, in certain embodiments, the process to identify the PSS may be sped up by maintaining a local record of the historical detections in term of PSS ID and frequency offset. Wireless node 315 may use this record to determine a priority of the PSSs. For example, once a new LTE-LAA/NR-U transmission is detected, the PSS search may be started from the PSS ID and frequency offset on top of the list to speed up the PSS identification and signal information extraction.

Figure 4:
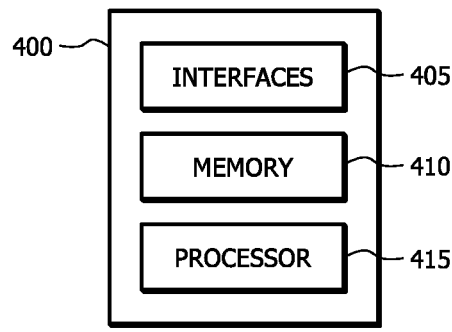
FIG. 4 illustrates a second configuration of a wireless node configured to detect a PSS, in accordance with certain embodiments.

FIG. 4 illustrates a second configuration of a wireless node 400 configured to detect a PSS, in accordance with certain embodiments. Wireless node 400 includes one or more interfaces 405, a memory 410, and a processor 415. Wireless node 400 may include multiple sets of one or more of the illustrated components for different wireless technologies supported by wireless node 400, such as, for example, GSM, WCDMA, LTE, NR, WiFi, WiMAX, or Bluetooth wireless technologies, just to mention a few. These wireless technologies may be integrated into the same or different chips or set of chips as other components within wireless node 400.

Interfaces 405 may include one or more antennas or antenna arrays, configured to send and/or receive wireless signals. In certain alternative embodiments, interfaces 405 may not include an antenna, but may include an interface for interfacing with an external antenna connectable to wireless node 400 through one of interfaces 405. Interfaces 405 and/or processor 415 may be configured to perform any receiving or transmitting operations described herein as being performed by wireless node 400. Any information, data and/or signals may be received from a network node and/or another wireless node.

In certain embodiments, interfaces 405 includes one or more of radio front end circuitry and an antenna. For example, interfaces 405 may include one or more filters or amplifiers that is connected to transmission components. In some embodiments, interfaces 405 are configured to receive analog or digital data that is sent out to other nodes or terminal devices via a wireless connection. In some embodiments, interfaces 405 may include circuitry configured to convert data from digital to analog and vice versa. Signals and data received may be passed to processor 415. Accordingly, interfaces 405 may include any suitable interfacing components for receiving and/or transmitting wireless communications.

In certain embodiments, interfaces 405 may also include one or more interfaces for communicating between different components of wireless node 400, including any components described in FIG. 3 of wireless node 300, such as transceiver 320, PSS Detector 325, PSS Identifier 330, or Cell Identifier 335.

Processor 415 may include be any electronic circuitry, including, but not limited to microprocessors, application specific integrated circuits (ASIC), application specific instruction set processor (ASIP), and/or state machines, that communicatively couples to memory 410 and controls the operation of wireless node 400. Processor 415 may be 8-bit, 16-bit, 32-bit, 64-bit or of any other suitable architecture. Processor 415 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 415 may include other hardware and software that operates to control and process information.

In certain embodiments, Processor 415 executes software stored on memory 410 to perform any of the functions described herein. For example, processor 415 may control the operation and administration of wireless node 400 by processing information received from memory 410, or any external databases, or any other components of wireless network 100. In certain embodiments, processor 415 may be configured to carry out one or more functions of wireless node 315 or any components thereof, such as transceiver 320, PSS detector 325, PSS identifier 330, and/or cell identifier 335. Processor 415 may be a programmable logic device, a microcontroller, a microprocessor, any suitable processing device, or any suitable combination of the preceding. Processor 415 is not limited to a single processing device and may encompass multiple processing devices.

In certain embodiments, processor 415 includes one or more of wireless transceiver circuitry, wireless signal processing circuitry, and application processing circuitry. In other embodiments, the processor 415 may include different components and/or different combinations of components. In certain embodiments processor 405 includes a system on a chip. In some embodiments, processor 415 or components thereof may be on a single chip, separate chips, or a set of chips.

Memory 410 may store, either permanently or temporarily, data, operational software, or other information for processor 415. In certain embodiments, memory may store one or more of local syncword 316, threshold 317, known PSS Sequences 327, wireless signal 306, indication PSS Present 326, PSS Identity 335, or any other information used in detecting and decoding PSS signal by wireless node 315. Memory 410 may include any one or a combination of volatile or non-volatile local or remote devices suitable for storing information. For example, memory 410 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 410, a disk, a CD, or a flash drive.

In certain embodiments, memory 410 may be operable to store a computer program, software, an application including one or more of logic, rules, code, tables, etc. and/or other instructions capable of being executed by processor 415. In particular embodiments, the software may include an application executable by processor 415 to perform one or more of the functions described herein. In certain embodiments, memory 410 may be or implemented as a NoSQL database. In some embodiments, processor 415 and memory 410 may be considered to be integrated.

In certain embodiments, some or all of the functionality described herein as being performed by wireless node 400 (and wireless node 110 and wireless node 300) may be provided by processor 415 executing instructions stored on memory 410, which in certain embodiments may be a computer-readable storage medium. In alternative embodiments, some or all of the functionality may be provided by processor 415 without executing instructions stored on a separate or discrete device readable storage medium, such as in a hard-wired manner. In any of those particular embodiments, whether executing instructions stored on a device readable storage medium or not, processor 415 can be configured to perform the described functionality.

Processor 415 may be configured to perform any determining, calculating, or similar operations (e.g., certain obtaining operations) described herein as being performed by wireless node 400. These operations, as performed by processor 415, may include processing information obtained by processor 415 by, for example, converting the obtained information into other information, comparing the obtained information or converted information to information stored by wireless node 400, and/or performing one or more operations based on the obtained information or converted information, and as a result of said processing making a determination.

In particular embodiments, one or more functions described herein relating to wireless node 110, wireless node 300, and/or wireless node 400 may be implemented using one or more interfaces 405, memory 410, and processor 415, their equivalents, or any suitable combination of hardware and software as understood by persons having skill in the art capable of carrying out one or more functions or methods described herein.

Figure 5:
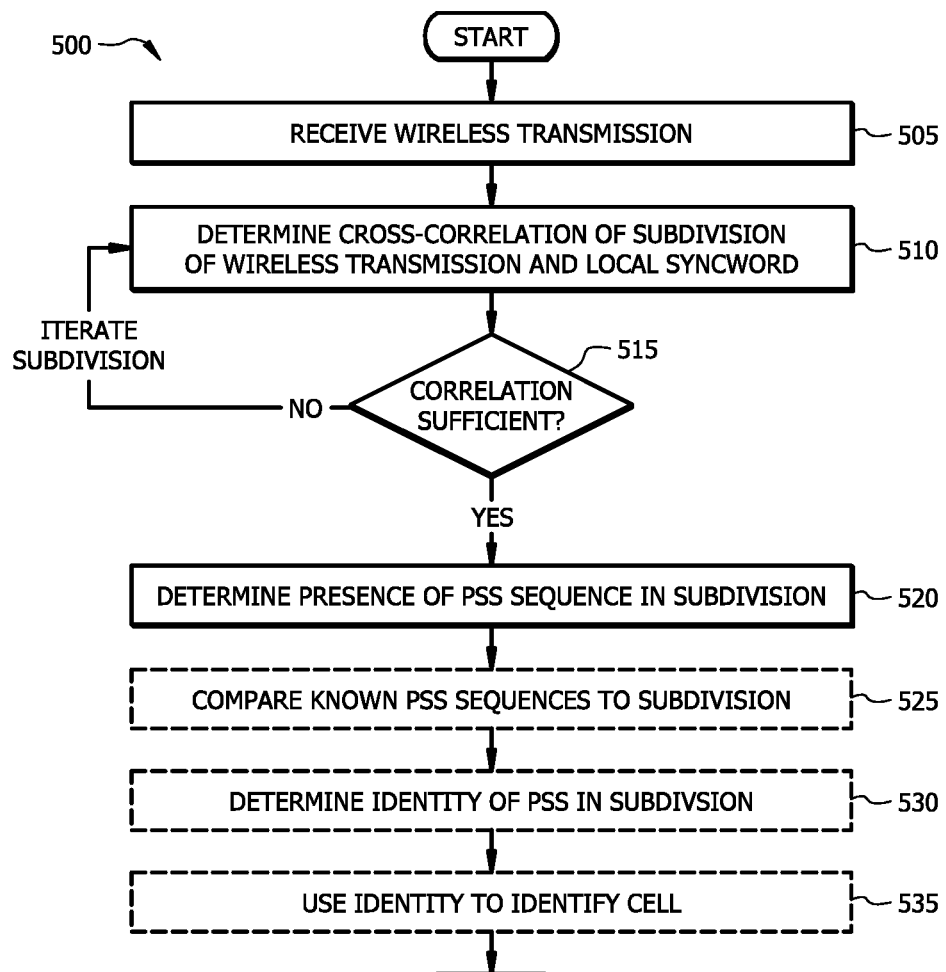
FIG. 5 is a flowchart diagram of an example method for detecting a PSS in a wireless node, in accordance with certain embodiments.

FIG. 5 is a flowchart diagram of an example method 500 for detecting a PSS in a wireless node, such as wireless node 315 and/or wireless node 400, in accordance with certain embodiments. Method 500 may start at step 505, in which a wireless transmission is received. For example, a wireless node, such as a wireless access point or a user equipment, may receive a broadcast from a wireless network node, such as network node 105 or network node 305. The wireless transmission may include a PSS sequence that can be used to identify the cell served by the network node, as described herein. The wireless transmission may be subdivided into time and/or frequency-divided subdivisions that may be further processed. The PSS of the wireless signal may be present in one or more of the subdivisions.

At step 510, a subdivision of the wireless signal is used to determine a cross-correlation between the subdivision and a local syncword, such as local syncword 316. The local syncword correlates to any primary synchronization signal, PSS, of a plurality of PSSs defined for synchronization in the wireless network. In certain embodiments, step 510 includes the substep of sampling the received wireless transmission into a plurality of time-based subdivisions.

At step 515, a determination is made whether the determine correlation is sufficient to indicate the presence of a PSS in the subdivision. The determination in step 515 may be based on a comparison to a threshold or one or more other criteria. At step 520, based on the cross-correlation, one PSS of the plurality of PSSs is determined to be present in the subdivision of the wireless transmission. This may result in an indication to proceed the subdivision for further processing to determine the identity of the PSS contained in the wireless signal. If the correlation is not sufficient, method 500 may return to step 510 for another subdivision. In some embodiments, steps 510 and 515 are iterated for each subdivision. In some embodiments, the iteration continues until the identity of the PSS is determined.

Modifications, additions, or omissions may be made to method 500 depicted in FIG. 5. Method 500 may include more, fewer, or other steps. For example, in certain embodiments, method 500 includes one or more further optional steps 525, 530, and 535. At step 525, the subdivision with the PSS is compared to known PSS sequences. For example, wireless node 315 may use PSS identifier 330 to compare an extracted PSS from the subdivision to known PSS sequences 327. For example, step 525 may include substeps of calculating correlation values between each known PSS sequence and the subdivision PSS and determining which known PSS sequence has the highest correlation and/or whether the correlation value exceed a threshold. Then, at step 530, the identity of the PSS in the subdivision may be determined. This may include estimating and adjusting for frequency offset and other processing steps as described herein. For example, in certain embodiments, the wireless node may multiply pairs of time domain samples of the subdivision to create a uniform phase offset applied to the subdivision. At optional step 535, the identity of the PSS may be used to identify the cell and/or other information about the cell that may be used by a wireless node, such as wireless nodes 315 or 400.

Additionally, steps may be performed in parallel or in any suitable order. While discussed as wireless node 315 and/or wireless node 400 as performing certain steps, any suitable component of wireless node 315 and/or wireless node 400 may perform one or more steps of the methods. Additionally, method 500 may include any suitable step to carry out any of the described functions of wireless node 315 and/or wireless node 400. Further, any of steps of method 500 may computerized and/or carried out using hardware, such as processor 415 of wireless node 400, or any other suitable system implementing one or more components of wireless node 315 and/or wireless node 400, such as any hardware or software implementing transceiver 320, PSS detector 325, PSS identifier 330, or cell identifier 335.

Although wireless nodes are described herein with reference to their use in particular wireless environments, e.g., wireless networks using the WiFi standard or radio networks such as an LTE or 5G NR network, the techniques and technical improvements thereof are also applicable to any suitable environment where detection of a primary synchronization signal is necessary.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A wireless node in a wireless communication network, comprising:
   one or more interfaces configured to receive wireless transmissions;
   a memory comprising instructions; and
   a hardware processor;
   wherein the wireless node, when executing the instructions at the hardware processor, is configured to:
   sample a received wireless transmission into a plurality of time-based subdivisions;
   for each subdivision of the wireless transmission:
      determine a cross-correlation between the subdivision and one local syncword, wherein the local syncword is a sequence that, based on successfully correlating to all primary synchronization signals, PSSs, of a plurality of different PSSs defined for synchronization in the wireless network, represents the plurality of different PSSs; and
      based on the cross-correlation with the local syncword, determine whether one PSS of the plurality of different PSSs is present in the subdivision of the wireless transmission.

2. The wireless node of claim 1, wherein the wireless node is further configured to, upon determining that one PSS of the plurality of different PSSs is present in a first subdivision, determine an identity of the PSS present in the first subdivision.

3. The wireless node of claim 2, wherein the wireless node is configured to determine the identity of the PSS sequence by:
comparing each of the plurality of different PSSs to the first subdivision of the wireless transmission; and
determining the identity of the PSS sequence as one of the defined PSS sequences that is most correlated with the first subdivision.

4. The wireless node of claim 1, wherein the construction of the local syncword is different from an addition of each of the defined PSS sequences together.

5. The wireless node of claim 1, wherein the construction of the local syncword minimizes the variation between cross-correlation peaks for each of the defined PSS sequences.

6. The wireless node of claim 1, wherein the plurality of different PSSs are a set of PSS sequences defined for Long-Term Evolution networks or a set of PSS sequences defined for 5G New Radio networks.

7. The wireless node of claim 1, wherein the wireless node is configured to determine whether one of the defined PSS sequences is present in the subdivision of the wireless transmission by:
comparing the cross-correlation to a predetermined threshold; and
determining that one of the defined PSS sequences is present if the cross-correlation exceeds the predetermined threshold.

8. The wireless node of claim 1, wherein, before the wireless node determines the cross-correlation between the subdivision and the local syncword, the wireless node is further configured to, for each subdivision of the wireless transmission, multiply pairs of time domain samples of the subdivision to create a uniform phase offset applied to the subdivision.

9. The wireless node of claim 1, wherein the wireless node is a wireless access point.

10. The wireless node of claim 1, wherein the wireless node is a user equipment configured to receive and transmit signals on one or more of a LTE and 5G NR network.

11. A method in a wireless network, the method comprising:
sampling a received wireless transmission into a plurality of time-based subdivisions;
for each subdivision of the wireless transmission:
determining a cross-correlation between the subdivision and one local syncword, wherein the local syncword is a sequence that, based on successfully correlating to all primary synchronization signals, PSSs, of a plurality of different PSSs defined for synchronization in the wireless network, represents the plurality of different PSSs; and
based on the cross-correlation with the local syncword, determining whether one PSS of the plurality of different PSSs is present in the subdivision of the wireless transmission.

12. The method of claim 11, further comprising, upon determining that one PSS of the plurality of different PSSs is present in a first subdivision, determining an identity of the PSS present in the first subdivision.

13. The method of claim 12, wherein determining the identity of the PSS sequence comprises:
comparing each of the plurality of different PSSs to the first subdivision of the wireless transmission; and
determining the identity of the PSS sequence as one of the defined PSS sequences that is most correlated with the first subdivision.

14. The method of claim 11, wherein the construction of the local syncword is different from an addition of each of the defined PSS sequences together.

15. The method of claim 11, wherein the construction of the local syncword minimizes the variation between cross-correlation peaks for each of the defined PSS sequences.

16. The method of claim 11, wherein the plurality of different PSSs are a set of PSS sequences defined for Long-Term Evolution networks or a set of PSS sequences defined for 5G New Radio networks.

17. The method of claim 11, wherein determining whether one of the defined PSS sequences is present in the subdivision of the wireless transmission comprises:
comparing the cross-correlation to a predetermined threshold; and
determining that one of the defined PSS sequences is present if the cross-correlation exceeds the predetermined threshold.

18. The method of claim 11, further comprising, before determining the cross-correlation between the subdivision and the local syncword, for each subdivision of the wireless transmission, multiplying pairs of time domain samples of the subdivision to create a uniform phase offset applied to the subdivision.

19. The method of claim 11, wherein the steps of the method are performed in a wireless access point.

20. The method of claim 11, wherein the steps of the method are performed in a user equipment configured to receive and transmit signals on one or more of a LTE and 5G NR network.

* * * * *